April 5, 1960 J. S. WHITE ET AL 2,931,616
FAIL-SAFE FLUID PRESSURE RESPONSIVE VALVE
Filed July 3, 1956
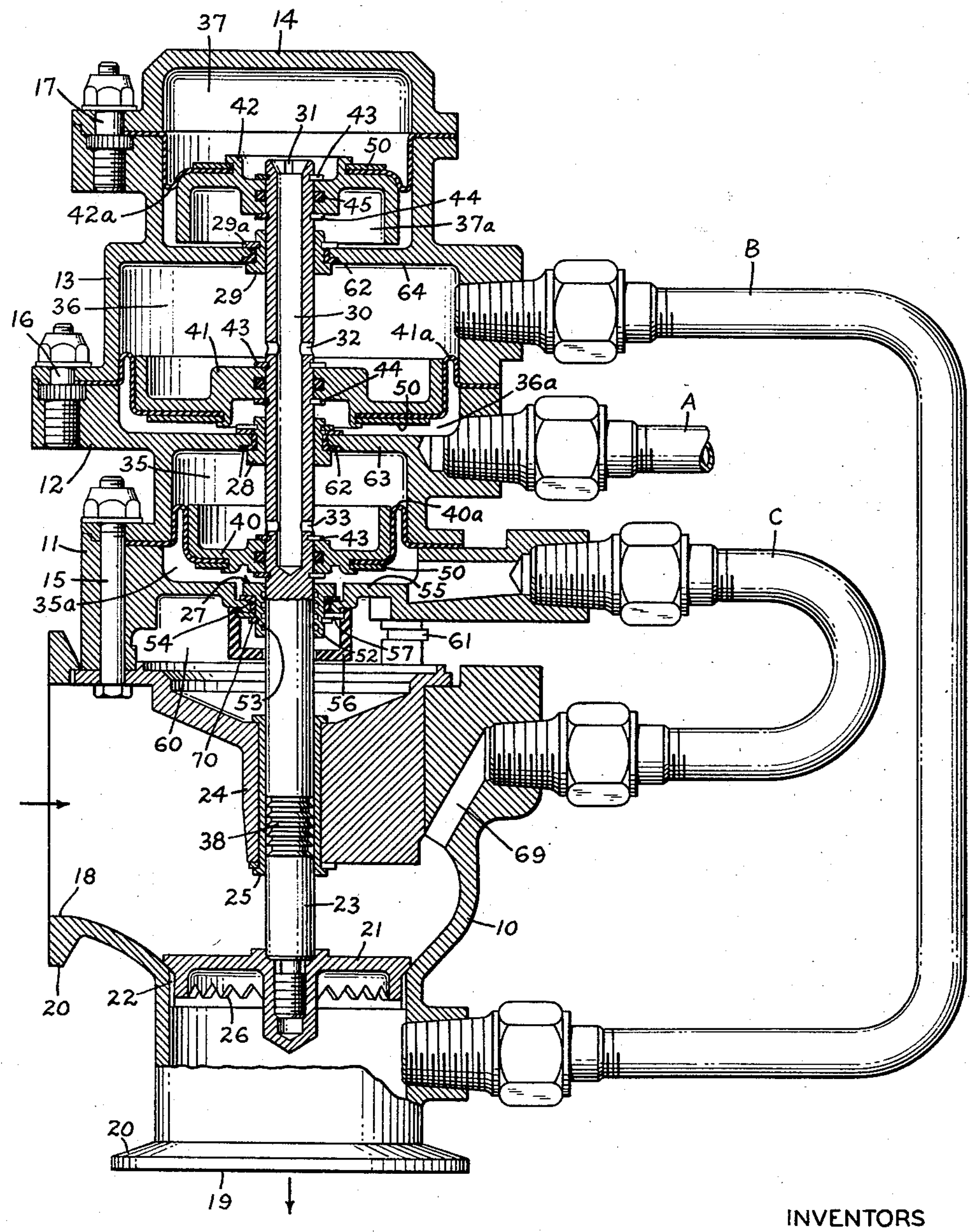
INVENTORS
JAMES S. WHITE
WALTER H. RUCKS
BY
Campbell, Brumbaugh, Free & Graves
THEIR ATTORNEYS United States Patent Office 2,931,616 Patented Apr. 5, 1960

1

2,931,616

FAIL-SAFE FLUID PRESSURE RESPONSIVE VALVE

James S. White, Norfolk, Va., and Walter H. Rucks, Islip, N.Y., assignors to Fairchild Engine and Airplane Corporation, Bay Shore, N.Y., a corporation of Maryland Application July 3, 1956, Serial No. 595,672

7 Claims. (Cl. 251—52)

This invention relates to valves generally and, more particularly, to an actuator controlled valve wherein the valve is instantaneously positioned in response to an error signal from a controller.

The actuator controlled valve of the present invention is interposed in a passage and the pressure of the fluid to be controlled by the valve tends normally to urge the valve to closed position. The pressure urging the valve to closed position, however, is in a major part counterbalanced by the pressure of the fluid whose flow is to be controlled. Thus, the counterbalancing pressure is always in predetermined ratio with the pressure tending to close the valve, regardless of changes in the pressure thereof.

The actual opening and closing of the valve is controlled by a variable pressure, such as the output pressure of a control device. The output pressure of the control device imparts an opening force against the valve which supplements the counterbalancing force, and when the sum of the forces imparted by the control pressure and the counterbalancing pressure exceeds the closing force exerted by the pressure of the fluid to be controlled, the valve will be adjusted to open position.

The valve, therefore, is of a fail safe design, and in the event of any mechanical failure of the actuator or any failure of the controller, the valve will be automatically held closed by the pressure of the fluid which it controls. The valve also has an anticipatory action in that when a change in pressure occurs in the fluid to be controlled, the valve senses the change even before the controller and initiates a correction for the change.

The actuator controlled valve of the present invention also incorporates a feature whereby the pressure downstream of the valve is in communication with the actuator to balance any tendency of the fluid downstream of the valve to exert an upward force which would tend to open the valve. This pressure, therefore, serves as a feedback signal to the actuator which helps to stabilize the valve.

A dampening action is provided in the operation of the valve to afford increased stability during transient changes in the pressure of the controlling fluid or the fluid to be controlled from producing undesirable response in the operation of the valve.

The present invention is particularly applicable to control systems wherein a modulating effect in the response of the valve is required in addition to instantaneous response. Temperature conditions and altitude conditions have virtually no effect on the operation of the valve, so that it is ideally suited for installation in aircraft.

These and other features of the present invention will be apparent from an understanding of the present invention. The invention is described in detail in the specification which follows, and the invention is illustrated in the accompanying drawing.

The figure in the drawing is a cross-sectional elevation view of the actuator controlled valve of the present invention.

Referring to the drawing, the valve assembly housing

2 comprises a lower valve housing 10 and an actuator housing which surmounts the valve housing. The actuator housing comprises the housing components 11, 12 and 13 and a cover 14. The housing component 11 seats on top of the valve housing 10, the housing component 12 seats on top of the housing component 11, and the three are attached together by bolts 15. The housing component 13 seats on top of the housing component 12, and they are attached together by bolts 16. The cover 14 is attached to the hosuing component 13 by bolts 17.

The valve housing 10 of the valve assembly provides a passage therein having an inlet 18 and an outlet 19. The inlets and outlets 18 and 19, respectively, are formed with flanges 20 fashioned to be secured with other conduits by means of special clamps (not shown).

The valve housing 10 of the valve assembly contains a poppet valve 21, a valve seat 22, a valve stem 23, and a valve guide assembly 24. The valve guide assembly 24 is formed with a central opening therein which receives a valve guide bushing 25 which preferably is made of a corrosion resistant material having a low coefficient of thermal expansion. The valve stem 23 is accommodated for axial movement within the valve guide bushing 25.

The pressure of the fluid entering the valve housing 10 through the inlet 18 tends to urge the valve 21 to closed position against the valve seat 22. As will be explained in greater detail below, the opening and closing of the valve 21 is controlled in response to variations of pressure in the conduit A produced by a suitable controlling device (not shown). It suffices to say for an understanding of the present invention that the valve 21 is opened in response to a predetermined increase in pressure in the conduit A and, within certain limits, the flow through the valve increases as the pressure in the conduit increases.

The change in the rate of flow through the valve as the valve is raised above its seat is determined by the toothed notches 26 formed in the outer periphery of the downstream end of the valve 21, the depth, angle of cut and number of the teeth imparting to the fluid the flow characterization desired. Thus, as the valve is raised upwardly above its seat, the flow of fluid from the inlet 18 to the outlet 19 will be established as soon as the notches are raised above the upper end of the seat and the flow will increase as the valve is raised further above its seat.

The valve stem 23 is made of a chrome plated, corrosion resistant steel, and it is guided for axial movement within seal assemblies 27, 28 and 29 of the housing components 11, 12 and 13, respectively. A passage 30 is drilled longitudinally through the stem 23 at its upper end, and holes 31, 32 and 33 communicate with the passage 30 to equalize the pressure in the chambers 35, 36 and 37. At the lower end of the valve stem 23 there are circumferential grooves or serrations 38 formed in the shaft to provide a labyrinth seal and also to shear any ice formations which may form within the guide bushing 25 at low temperature operations.

Lower, intermediate and upper piston assemblies 40, 41 and 42 are attached to the valve stem 23. Each of these piston assemblies is attached to the stem in identical fashion, namely, by upper and lower split retaining rings 43, 44 which engage ring grooves cut in the outer periphery of the valve stem. Intermediate the upper and lower retaining rings 43, 44, the piston assemblies 40, 41 and 42 each accommodate an O ring seal 45 to form a seal between both sides thereof.

Flexible diaphragms **40*a*, 41*a* and 42*a* are secured to the piston assemblies 40, 41 and 42, respectively. The inner peripheries of each of the diaphragms 40*a*, 41*a* and 42*a* are clamped to their respective piston assemblies by washers 50, and the outer peripheries of the diaphragms are clamped, respectively, between the housing components 11 and 12, 12 and 13**, and between the housing component 13 and the cover 14. The piston and diaphragm assembly 40, 40a separates the upper and lower chambers 35, 35a, respectively; the piston and diaphragm assembly 41, 41a separates upper and lower chambers 36, 36a, respectively; and the piston and diaphragm assembly 42, 42a separates upper and lower chambers 37, 37a, respectively.

The seal assembly 27 within the housing component 11 comprises a corrosion resistant steel bushing 52 which has a plurality of spaced apart annular grooves 53 cut in its inner periphery to create a labyrinth seal, a high temperature rubber grommet 54 which forms a seal between the outer periphery of the bushing 52 and the partition 55 formed integrally with the housing component 11, and a dirt and dust cover 56. The cover 56 is held in place by snapping it onto a washer 57 which surrounds the outer periphery of the bushing 52. The washer, in turn, is held in place by a retaining ring 70 surrounding the bushing 52 and engaging a circumferential groove in the bushing surface. Since the bushing 52 is resiliently mounted to the partition 55, it is free to take up any misalignment between the stem 23 and the opening in the partition 55, while at the same time affording an excellent seal for the diaphragm chamber 35a. The bushing 52 is held to close tolerances so as to provide minimum clearance with the outer periphery of the stem. The dust and dirt cover 56 is made of rubber or other suitable resilient material capable of withstanding high temperatures, and its purpose is to prevent foreign particles from entering the bushing 52. Air is permitted to enter the chamber 60 beneath the partition 55 through openings 61 in order to provide for the circulation of air between the valve and the actuator to reduce the temperature of the actuator.

As shown, the seal assemblies 28 and 29 are identical, each comprising a bushing surrounded by a rubber grommet 62. The seal 28 and the partition 63 provide a relatively leakproof separation between the chambers 35 and 36a, and the seal 29 and the partition 64 form a relatively leakproof separation between the chambers 36 and 37a.

As mentioned above, the chambers 35, 36 and 37 are connected by means of the longitudinal passage 30 formed in the stem 23, and the chamber 36 is in communication with the discharge side of the valve 21 by means of the conduit B. The chamber 35a is in communication with the interior of the valve housing 10 on the upstream side of the valve 21 by means of the conduit C and the bleed passage 69. The chamber 36a, as mentioned above, communicates via the conduit A with a source of variable control pressure. The chamber 37a formed from above by the piston and diaphragm assembly 42, 42a and from below by the partition 64 is completely sealed, except for some slight leakage through the seal 29. The seal is so designed that a tight closure is provided when the valve is actuated in the opening direction by pressure of the seal 29 on the lower surface of the compressible grommet 62. When the valve is moved in the closing direction, the metal washer 29a, mounted on the seal 29, is brought into contact with the upper surface of partition 64. Since this contact is metal to metal, a tight seal is not achieved, thereby affording the desired action.

In operation, the fluid to be controlled enters the valve housing 10 through the inlet 18 and impinges against the valve 21 urging it to closed position. When in closed position, the fluid is prevented from passing through the valve by the lapped seal between the valve seat and the poppet. This pressure is also applied to the chamber 35a by way of the bleed passage 69 and the conduit C. The pressure in the chamber 35a acts against the piston and diaphragm 40, 40a to urge the valve stem 23 upwardly. The effective surface area of the piston 40 and diaphragm 40a, however, is so proportioned with respect to the respective surface area of the valve 21 as to counterbalance a major portion, say 95%, of the closing force produced by the pressure on top of the poppet valve. The lifting force required to open the valve is provided by the control pressure within the chamber 36a which comes from the controller via the conduit A. Thus, a relatively small increase in pressure in the chamber 36a is capable of opening the valve to permit the flow of fluid from the inlet 18 to the outlet 19.

In the partially open position of the valve, the flow through the valve is determined by the number and shape of the notches formed in the poppet valve. The number and shape of these notches is also a factor on which the sensitivity of the valve depends.

The conduit B serves to bleed off pressure downstream of the valve, and this pressure is imposed via the conduit B and the passage 30 within the valve stem on top of all three piston assemblies 40, 41 and 42 to balance downstream pressure which may tend to exert an upward force on the underside of the poppet. This pressure, therefore, serves as a feedback signal to the actuator, which helps to stabilize the valve.

The dead air space 37a beneath the piston 42 and diaphragm 42a serves to provide a dampening effect during the closing of the valve to reduce the effects of transient changes in pressure. Leakage of the bushing of the seal 29, however, allows the pressure in the chamber 37a to equalize with the pressure in the chambers 35, 36 and 37 in a very short period of time, thus quickly rendering the piston assembly 42 ineffective. Thus, this piston assembly is effective to reduce the effect of transient pressure changes without appreciably slowing up the response of the valve to actual pressure signals transmitted via the conduit A.

The invention has been shown in preferred form only and by way of example, and obviously many variations and modifications may be made therein without departing from the spirit of the invention. The invention, therefore, is not to be limited to any specified form or embodiment except in so far as such limitations are set forth in the claims.

We claim:

1. A valve assembly comprising a passage for the flow of a fluid, a valve interposed in said passage, the pressure of the fluid upstream of the valve exerting a force normally urging the valve to closed position, an actuator including first and second chambers having pressure responsive movable walls connected to said valve for the control thereof, a passage establishing communication between the upstream side of the valve and one side of one of said pressure responsive movable walls of the actuator, the pressure of the fluid exerted on said one side of said movable wall providing a counterbalancing force on said valve opposing said closing force, the effective areas of said valve and said one side of the said movable wall being proportioned to provide a predetermined ratio between said forces, a passage establishing communication between a control fluid of variable pressure and one side of the other of said pressure responsive movable walls, whereby variations in the pressure of the control fluid influence the position of the valve, and passage means establishing communication between the downstream side of the valve and the opposite sides of both of said pressure responsive movable walls, whereby the pressure downstream of said valve acts on both of said pressure responsive movable walls in opposition to the pressure upstream of said valve and the control pressure.

2. A valve assembly as set forth in claim 1, including means connected to said actuator for dampening the operation of the valve to prevent the operation of the valve from being influenced by transient changes in the pressures of the fluids which would otherwise affect the operation of the valve.

3. A valve assembly as set forth in claim 1, wherein the valve is provided with a plurality of notches therein which increase in size toward the downstream end thereof to impart the desired characterization to the flow during the initial movement of the valve.

4. An actuator controlled valve comprising a passage for the flow of fluid, an adjustable valve therein to control the flow of fluid through the passage, the pressure of the fluid upstream of the valve exerting a force tending to close the valve, an actuator comprising a plurality of chambers defined within the housing, an axially movable actuator rod extending through the chambers and connected to the valve for the adjustment thereof, a plurality of movable diaphragms attached to said rod, each of said movable diaphragms dividing one of the chambers in two sections, a passage connecting the upstream side of the valve with one of said chambers, whereby the action of the pressure of the fluid to be controlled exerts an opening force on the valve through the actuator rod which counterbalances at least a part of said force tending to close the valve, a passage communicating with another of said chambers for a control fluid, the pressure of which controls the adjustment of the valve, a passage connecting the downstream side of the valve with at least one of said chambers to counterbalance the effect of pressures downstream of the valve, and a passage connecting the chamber in communication with the downstream side of the valve with at least one additional of said plurality of chambers.

5. An actuator controlled valve as set forth in claim 4 in which the passage connecting the chamber in communication with the downstream side of the valve with at least one additional of said plurality of chambers is a passage which extends through the actuator rod.

6. An actuator controlled valve comprising a valve housing defining a passage therethrough, a valve seat within said passage, a poppet valve adjustable therein relative to the valve seat to control the flow of fluid through the passage, the valve being urged to closed position by the pressure of the fluid upstream of the valve, an elongated valve stem connected to the poppet valve, means for guiding the valve stem for axial movement to adjust the position of the valve relative to the valve seat, an actuator housing connected to the valve housing, at least two chambers defined within the actuator housing, the valve stem extending into said chambers, a movable diaphragm within each of said chambers and dividing the chamber in two sections, said movable diaphragms being attached to the valve stem, a passage connecting the passage within the valve housing upstream of the valve with one side of one of said chambers, whereby the action of the pressure of the fluid to be controlled exerts a force against the movable diaphragm which acts through the valve stem to counterbalance at least a part of the pressure tending to close the valve, a passage communicating with one section of another of said chambers for a control fluid, the pressure of which exerts a force against the respective movable diaphragm which supplements the counterbalancing force, the pressure of said control fluid controlling the position of the valve, and passage means connecting the passage within the valve housing downstream of the valve with the other section of each of said chambers to counterbalance the effect of pressure downstream of the valve.

7. An actuator controlled valve as set forth in claim 6, in which the means for guiding the valve stem for axial movement includes a sleeve, and including a plurality of circumferential serrations formed on the portion of the valve stem within the sleeve.

References Cited in the file of this patent

UNITED STATES PATENTS

| | | |
|---|---|---|
| 2,637,342 | Shannon | May 5, 1953 |
| 2,788,192 | Mountford | Apr. 9, 1957 |

FOREIGN PATENTS

| | | |
|---|---|---|
| 665,511 | Great Britain | Jan. 23, 1952 |
| 149,362 | Great Britain | Dec. 9, 1952 |